United States Patent [19]

Lew et al.

[11] Patent Number: 5,247,836
[45] Date of Patent: Sep. 28, 1993

[54] CONVECTIVE ELECTRIC CURRENT FLOWMETER

[76] Inventors: Hyok S. Lew; Yon K. Lew; Hyon S. Lew, all of 7890 Oak St., Arvada, Colo. 80005

[21] Appl. No.: 825,390

[22] Filed: Jan. 24, 1992

[51] Int. Cl.$^5$ .............................................. G01F 1/56
[52] U.S. Cl. ................................. 73/861.08; 73/861.06
[58] Field of Search ...................... 73/861.08, 861.09

[56] References Cited

U.S. PATENT DOCUMENTS

| | | | |
|---|---|---|---|
| 3,374,672 | 3/1968 | Horne | 73/861.09 |
| 4,056,003 | 11/1977 | Zizine | 73/861.09 |
| 4,074,572 | 2/1978 | Bullis et al. | 73/861.09 |
| 4,193,296 | 3/1980 | Janka | 73/861.09 |
| 4,248,086 | 2/1981 | Zizine | 73/861.09 |

Primary Examiner—Herbert Goldstein
Assistant Examiner—Elizabeth L. Dougherty

[57] ABSTRACT

A flowmeter comprises a first electrode disposed on a first cross section of the flow passage and a second electrode disposed on a second cross section of the flow passage downstream of the first cross section, and an alternating electric power supply providing an alternating electric potential difference across the first and second electrodes, that creates flow of electric current across the first and second electrodes in two opposite directions, wherein the fluid velocity is determined as a function of difference between the electric current flowing from the first electrode to the second electrode and the electric current flowing from the second electrode to the first electrode.

12 Claims, 2 Drawing Sheets

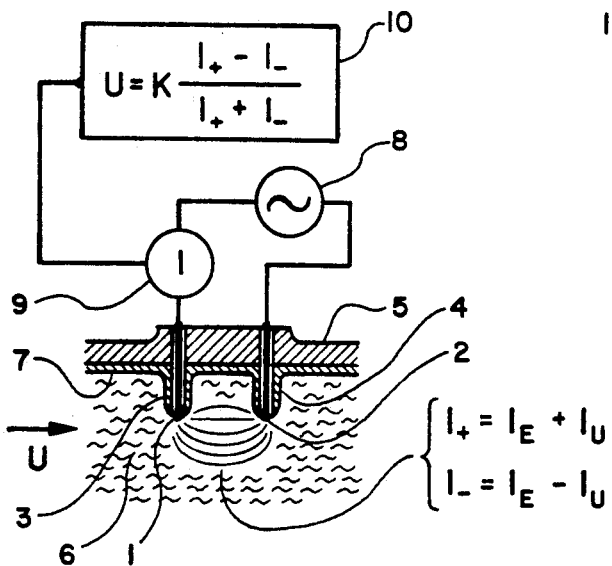
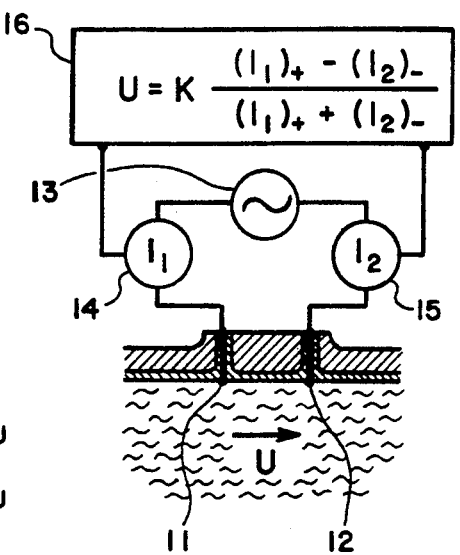
Fig. 1          Fig. 2
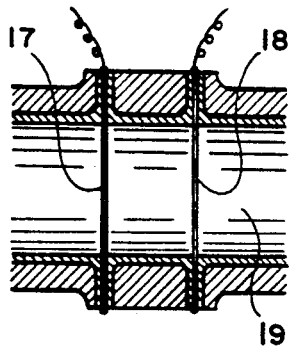
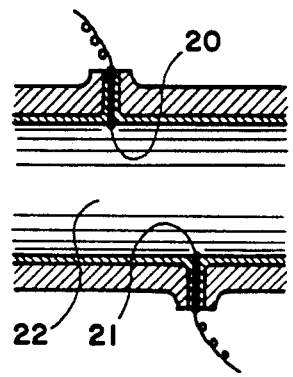
Fig. 3          Fig. 4
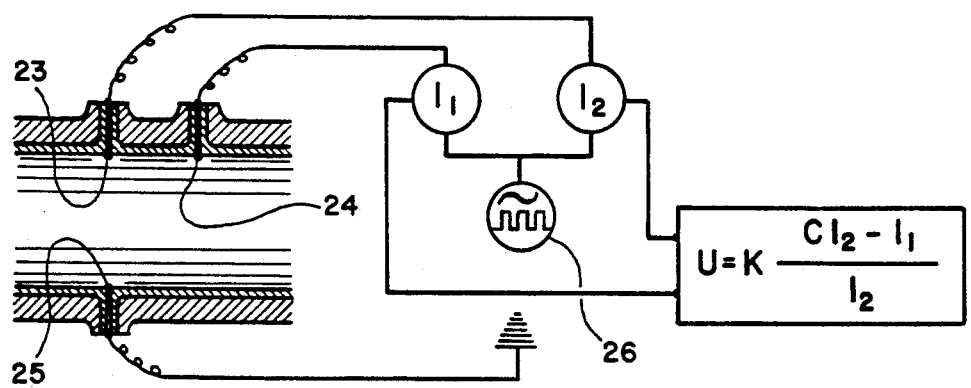
Fig. 5

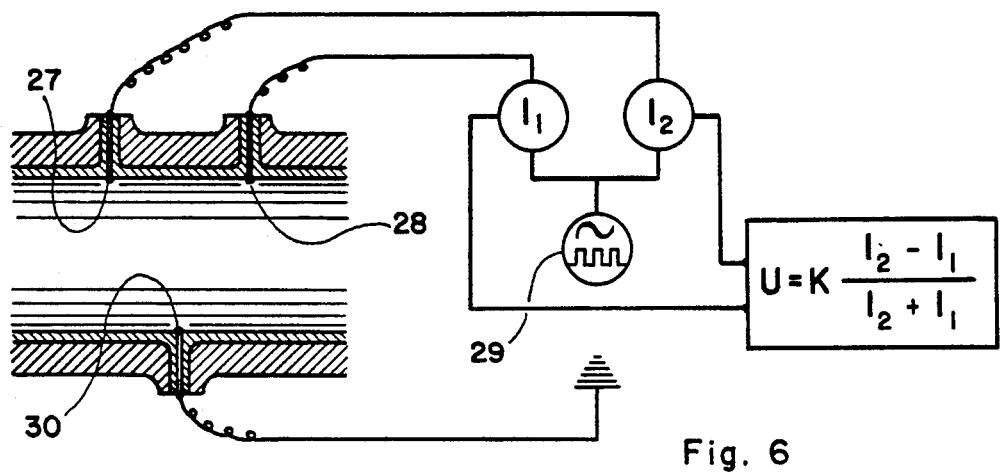
Fig. 6
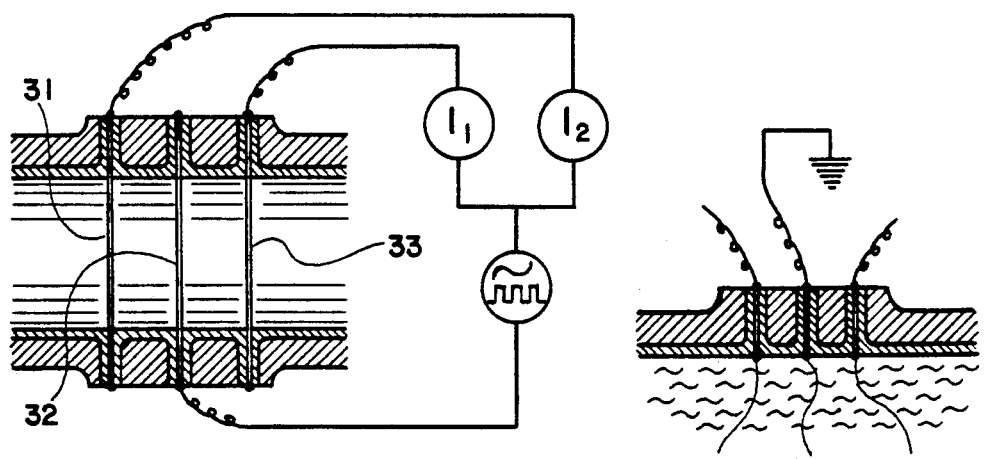
Fig. 7
Fig. 8
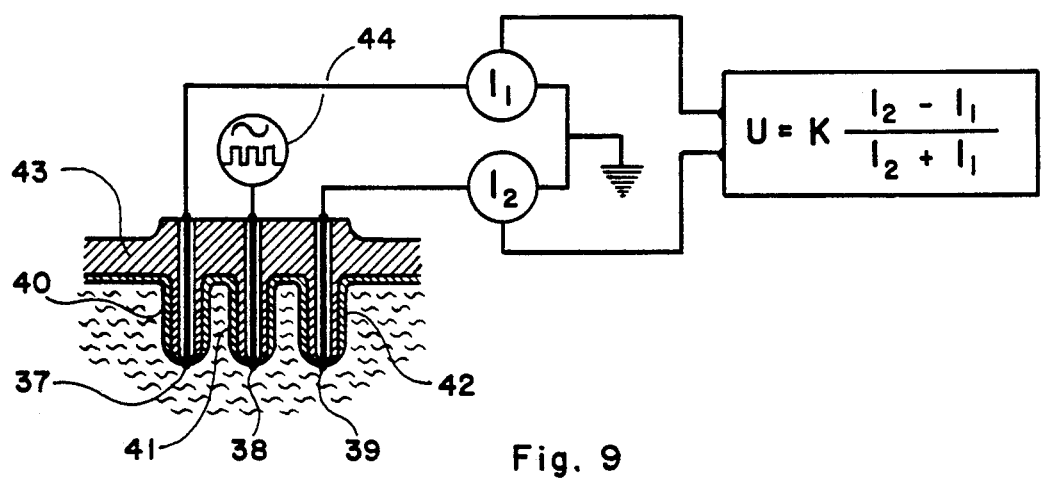
Fig. 9

CONVECTIVE ELECTRIC CURRENT FLOWMETER

BACKGROUND OF THE INVENTION

The magnetic induction flowmeter or mag-flowmeter has become quite popular in measuring the volume flow rate of electrically conductive fluid, which mag-flowmeter determines the velocity of fluid by measuring the electromotive force induced by the electrically conductive fluid moving across the imposed magnetic field according to Faraday's principles. While the mag-flowmeters provide quite accurate and reliable flow measurements, they suffer from high costs and an inability to measure the fluid flow at very low velocity. It is a well known fact that the magnetic force is none other than the dynamic form of the electric force and has a magnitude much smaller than the electrostatic force. All electrodynamic phenomena taking place in the physical world can be analyzed without relying on the concept of the magnetic force, when the electrostatic force as well as the electrodynamic force is accounted into the electric force acting on the electric charge. The electrostatic force $\bar{F}_S$ experienced by a stationary charge e located in a stationary electric field $\bar{E}$ is given by equation $$\bar{F}_S = e\bar{E}. \tag{1}$$

The electrodynamic force $\bar{F}_D$ experienced by a moving charge e at a velocity $\bar{V}_e$ through an electrodynamic field $\bar{E}$ moving at a velocity $\bar{V}_E$ is given by equation $$\bar{F}_D = \frac{e}{c^2} \bar{V}_e \times (\bar{V}_E \times \bar{E}), \tag{2}$$

where c is the speed of the light. It is readily observed that the magnitude of the electrodynamic force $\bar{F}_D$ is much smaller than the magnitude of the electrostatic force $\bar{F}_S$ as long as the velocities of the electric charge and the electric field do not approach the speed of light. In other words, electrostatic phenomena occuring in normal physical states existing in an earthly environment are much more pronounced than the electrodynamic (magnetic) phenomena. This fact suggests that a flowmeter of great versatility can be constructed by directly using an electric phenomenon instead of the magnetic phenomena.

BRIEF SUMMARY OF THE INVENTION

The primary object of the present invention is to provide the "convective electric current flowmeter (CEC flowmeter)" comprising two electrodes respectively disposed on two different cross sections of a flow passage and exposed to the conductive fluid medium moving through the flow passage, and a source of alternating electromotive force imposing an alternating electric potential difference acorss the two electrodes; wherein the fluid velocity is determined from a differential combination of two electric currents respectively flowing in two opposite directions between the two electrodes under the influence of the alternating electromotive force.

Another object of the present invention is to provide the CEC flowmeter comprising three electrodes wherein first two electrodes respectively disposed at two different cross sections of a flow passage are connected to the first terminal of an electromotive force source, while the third electrode preferably disposed at a cross section of the flow passage intermediate the first two electrode is grounded or connected to the second terminal of the electromotive force source opposite to the first terminal connected to the first two electrodes; wherein the fluid velocity is determined from a differential combination of two electric currents respectively flowing to or from the first two electrodes.

A further object of the present invention is to provide the CEC flowmeter constructed in essentially the same way as that described in the above-presented another object of the present invention with an exception that the third electrode is now connected to the first terminal of the electromotive force source, while the first two electrodes are grounded or connected to the second terminal of the electromotive force source.

These and other objects of the present invention will become clear as the description thereof progresses.

BRIEF DESCRIPTION OF THE FIGURES

The present invention may be described with a greater clarity and specificity by referring to the following figures:

FIG. 1 illustrates a cross section of an embodiment of the CEC (convective electric current) flowmeter of the present invention including two electrodes.

FIG. 2 illustrates a cross section of another embodiment of the CEC flowmeter including two electrodes.

FIG. 3 illustrates a cross section of a further embodiment of the CEC flowmeter including two electrodes.

FIG. 4 illustrates a cross section of yet another embodiment of the CEC flowmeter including two electrodes.

FIG. 5 illustrates a cross section of an embodiment of the CEC flowmeter including three electrodes.

FIG. 6 illustrates a cross section of another embodiment of the CEC flowmeter including three electrodes.

FIG. 7 illustrates a cross section of a further embodiment of the CEC flowmeter including three electrodes.

FIG. 8 illustrates a cross section of yet another embodiment of the CEC flowmeter including three electrodes.

FIG. 9 illustrates a cross section of yet a further embodiment of the CEC flowmeter including three electrodes.

DESCRIPTION OF THE ILLUSTRATED EMBODIMENTS

In FIG. 1, there is illustrated a cross section of an embodiment of the convective electric current (CEC) flowmeter of the present invention, that comprises two electrodes 1 and 2 respectively disposed at the extremities of two pylons 3 and 4 anchored to and extending from the wall 5 of a flow passage into the fluid stream 6 moving at a velocity U. The surface of the flow passage wall and those of the two pylons 3 and 4 are lined with an electrically insulating layer 7. The two electrodes 1 and 2 are respectively connected to two opposite terminals of a source of alternating electromotive force 8. An ammeter 9 measures electric current flows between the two electrodes 1 and 2. The data processor 10 determines the fluid velocity U as a function of the values of the electric currents provided by the ammeter 9.

The electric current $I_+$ flowing from the electrode 1 to the electrode 2 is given by equation $$I_+ = ANeV_e + BNeU. \tag{3}$$

where A and B are physical constants, N is the number density of charged particles, e is electric charge of the individual charged particle, $V_e$ is the charged particle migration velocity, and U is the fluid velocity. The first term on the right hand side of equation (3) is called the "conductive electric current", while the second term thereof is called the "convective electric current". Equation (3) can be written in the following form in terms of the conductive and convective electric currents $I_E$ and $I_U$;

$$I_+ = I_E + I_U.  \quad (4)$$

It is readily recognized that the electric current flow from the electrode 2 to the electrode 1 is given by euqation $$I_- = I_E - I_U.  \quad (5)$$

When equations (4) and (5) are combined to eliminate the conductive electric current term $I_E$, the following relationship results in :

$$I_U = \frac{I_+ - I_-}{2},  \quad (6)$$

which may be written in the form $$U = C(I_+ - I_-),  \quad (7)$$

where C is a constant of proportionality that is proportional to the electromotive force imposed by the source 8 thereof. Equation (7) may be written in the form that is independent of the magnitude of the electromotive force imposed by the source 8 thereof $$U = K\frac{I_+ - I_-}{I_+ + I_-},  \quad (8)$$

where K is a proportionality constant empirically determined by calibrating the flowmeter. The denominator in the right hand side of equation (8) may be changed to or $I_+$ or $I_-$ as exemplified by the formula representing the data processor shown in FIG. 5. The values of the electric currents appearing in equations (7) or (8) or other alternative form thereof may be the peak values, average values, root mean square values, or instantaneous values measured by the ammeter 9.

In FIG. 2, there is illustrated a cross section of another embodiment of the CEC flowmeter of the present invention that comprises two electrodes 11 and 12 disposed flush to the wall of the flow passage and respectively connected to the two opposite terminals of an alternating electromotive force source 13. Two ammeters 14 and 15 respectively measures the electric currents to or from the two electrodes 11 and 12. The data processor 16 determines the fluid velocity U by equation $$U = K\frac{(I_1)_+ - (I_2)_-}{(I_1)_+ + (I_2)_-},  \quad (9)$$

where $(I_1)_+$ is the electric current flow to (from) the electrode 11 and $(I_2)_-$ is the electric current flow to (from) the electrode 12. Of course, equation (7) may be replaced by equation $$U = K\frac{(I_1)_+ - (I_2)_+}{(I_1)_+ + (I_2)_+},  \quad (10)$$

where $(I_2)_+$ is the electric current flow from the electrode 12.

In FIG. 3, there is illustrated a cross section of a further embodiment of the CEC flowmeter of the present invention that comprises a pair of electrodes 17 and 18 of wire or pylon type structure, which are disposed across two different cross sections of the flow passage 19 and anchored to the electrically insulated wall of the flow passage at their extremities. In an alternative design, the wire or pylon type electrodes 17 and 18 may extend only partially across the two respective cross sections of the flow passage. It is readily recognized that the two electrodes 17 and 18 may be of a mesh or screen type extending over the entire cross section of the flow passage. The two electrodes may be wired in the manner shown in FIG. 1 or that shown in FIG. 2.

In FIG. 4, there is illustrated a cross section of yet another embodiment of the CEC flowmeter of the present invention, that includes two electrodes 20 and 21 disposed flush to the electrically insulated wall of the flow passage 22 in a diametrically opposing arrangement. This embodiment of the CEC flowmeter may operate on one of the two principles respectively described in conjunction with FIGS. 1 and 2.

In FIG. 5, there is illustrated a cross section of an embodiment of the CEC flowmeter of the present invention including three electrodes comprising the first two electrodes 23 and 24 disposed in an up-and-down stream arrangement, and the third electrode 25 disposed diametrically across the electrode 23. The two electrodes 23 and 24 are connected in a parallel arrangement to the first terminal of an electromotive force source that may supply an alternating or direct electromotive force in pulses or steady value. While the electrode 25 is grounded as shown in the particular illustrative embodiment, it may be connected to the second terminal of the electromotive force source 26 opposite to the first terminal thereof. This embodiment of the CEC flowmeter determines the fluid velocity by using equation $$U = K\frac{CI_2 - I_1}{I_2},  \quad (11)$$

where C is an empirically determined constant and $I_2$ and $I_1$ are respectively the electric currents to or from the two electrodes 23 and 24. The $I_2$ appearing in the denominator in the right hand side of equation (11) may be replaced with $I_1$ or $I_1+I_2$. In an alternative design, the electrical connections may be interchanged between one of the two electrodes 23 and 24, and the electrode 25.

In FIG. 6, there is illustrated a cross section of another embodiment of the CEC flowmeter of the present invention, that includes the first two electrodes 27 and 28 disposed in an up-and-down stream arrangement and connected in a parallel arrangement to the first terminal of an electromotive force source 29, and the third electrode 30 disposed diametrically opposite to the combination of the electrodes 27 and 28 on a cross section of the flow passage intermediate the two electrodes 27 and 28, that is grounded as shown in the particular illustrated embodiment, or it may be connected to the second terminal of the electromotive source 29 opposite to the first terminal. This embodiment of the flowmeter determines the fluid velocity by using a relationship similar to equation (8) or (9), which algorithm is carried out by the data processor.

It should be understood that the point terminal employed in the CEC flowmeter of the present invention such as the elements 27, 28 and 29 may be replaced by ring shaped terminals disposed on respective planes perpendicular to the central axis of the flow passage.

In FIG. 7, there is illustrated a cross section of a further embodiment of the CEC flowmeter including three wire or pylon type electrodes, that has essentially the same wiring and operates on the same principles as the embodiment shown in FIG. 6. In this particular embodiment, the middle electrode 32 is connected to the terminal of the electromotive force source opposite to the terminal supplying the electromotive force to the electrodes 31 and 33, which terminal 32 may be grounded in an alternative design.

In FIG. 8, there is illustrated a cross section of yet another embodiment of the CEC flowmeter of the present invention, that includes three electrodes 34, 35 and 36 disposed flush to the insulated wall of the flow passage following a line parallel to the direction of the fluid flow, which may be wired in the manner shown in FIG. 6 or 7.

In FIG. 9, there is illustrated a cross section of yet a further embodiment of the CEC flowmeter of the present invention, that has essentially the same construction as the embodiment shown in FIG. 8 with one exception being that the point electrodes 37, 38 and 39 are respectively disposed at the tips of three pylons 40, 41, and 42 anchored to and extending from the electrically insulated wall 43 of the flow passage. The middle electrode 38 is connected to an electromotive force source 44, while the two up-and-down stream electrodes 38 and 39 are grounded. This embodiment of the flowmeter operates on the same principles as those described in conjunction with FIG. 6. It should be understood that the wiring shown in FIGS. 5, 6, 7 and 9 are interchangeable. The embodiments shown in FIG. 6, 7, 8 and 9 work best when the middle electrode is disposed right at the midsection between the two up-and-down stream electrodes.

While the principles of the invention have now been made clear by the illustrative embodiments, there will be many modifications of the structures, arrangements, proportions, elements and materials which are obvious to those skilled in the art and particularly adapted to the specific working environments and operating conditions in the practice of the invention without departing from those principles. It is not desired to limit the invention to the particular illustrative embodiments shown and described and accordingly, all suitable modifications and equivalents may be regarded as falling within the scope of the invention as defined by the claims which follow.

We claim:

1. A device for measuring flow rate of fluid comprising in combination:
   a) a first electrode disposed on a first cross section of a flow passage, and a second electrode disposed on a second cross section of the flow passage;
   b) an alternating electromotive force source with two opposite terminals respectively connected to the first and second electrode respectively by two electrical connection means;
   c) means for measuring a first value of electric current flowing through one of the two electrical connection means in a first direction, and second value of the electric current flowing through said one of the two electrical connection means in a second direction opposite to said first direction; and
   d) means for determining flow rate of fluid moving through the flow passage as a function of a differential combination of the first and second value of the electric current.

2. A device as defined in claim 1 wherein said combination includes a third electrode exposed to the fluid moving through the flow passage and grounded to a grounding terminal.

3. A device as defined in claim 1 wherein said means for determining flow rate of fluid determines the flow rate as a function of a ratio between said differential combination of the first and second value of the electric current and an additive combination of the first and second value of the electric current.

4. A device as defined in claim 3 wherein said combination includes a third electrode exposed to the fluid moving through the flow passage and grounded to a grounding terminal.

5. A device as defined in claim 1 wherein said means for determining flow rate of fluid determines the flow rate as a function of a ratio between said differential combination of the first and second value of the electric current and one of the first and second value of the electric current.

6. A device as defined in claim 5 wherein said combination includes a third electrode exposed to the fluid moving through the flow passage and grounded to a grounding terminal.

7. A device for measuring flow rate of fluid comprising in combination:
   a) a first electrode disposed on a first cross section of a flow passage, and a second electrode disposed on a second cross section of the flow passage;
   b) an alternating electromotive force source with two opposite terminals respectively connected to the first and second electrode respectively by two electrical connection means;
   c) first means for measuring a first value of electric current flowing through one of the two electrical connection means in a first direction defined by a direction from the first electrode to the second electrode, and second means for measuring a second value of electric current flowing through the other of the two electrical connection means in a second direction defined by a direction from the second electrode to the first electrode; and
   d) means for determining flow rate of fluid moving through the flow passage as a function of a differential combination of said first value and said second value of the electric current.

8. A device as defined in claim 7 wherein said combination includes a third electrode exposed to the fluid moving through the flow passage and grounded to a grounding terminal.

9. A device as defined in claim 7 wherein said means for determining flow rate of fluid determines the flow rate as a function of a ratio between said differential combination of said first value and said second value of the electric current and an additive combination of said a and another value of the electric current.

10. A device as defined in claim 9 wherein said combination includes a third electrode exposed to the fluid moving through the flow passage and grounded to a grounding terminal.

11. A device as defined in claim 7 wherein said means for determining flow rate of fluid determines the flow rate as a function of a ratio between said differential combination of said first value and said second value of the electric current and one of said first value and said second value of the electric current.

12. A device as defined in claim 11 wherein said combination includes a third electrode exposed to the fluid moving through the flow passage and grounded to a grounding terminal.

* * * * *